Patented July 5, 1938

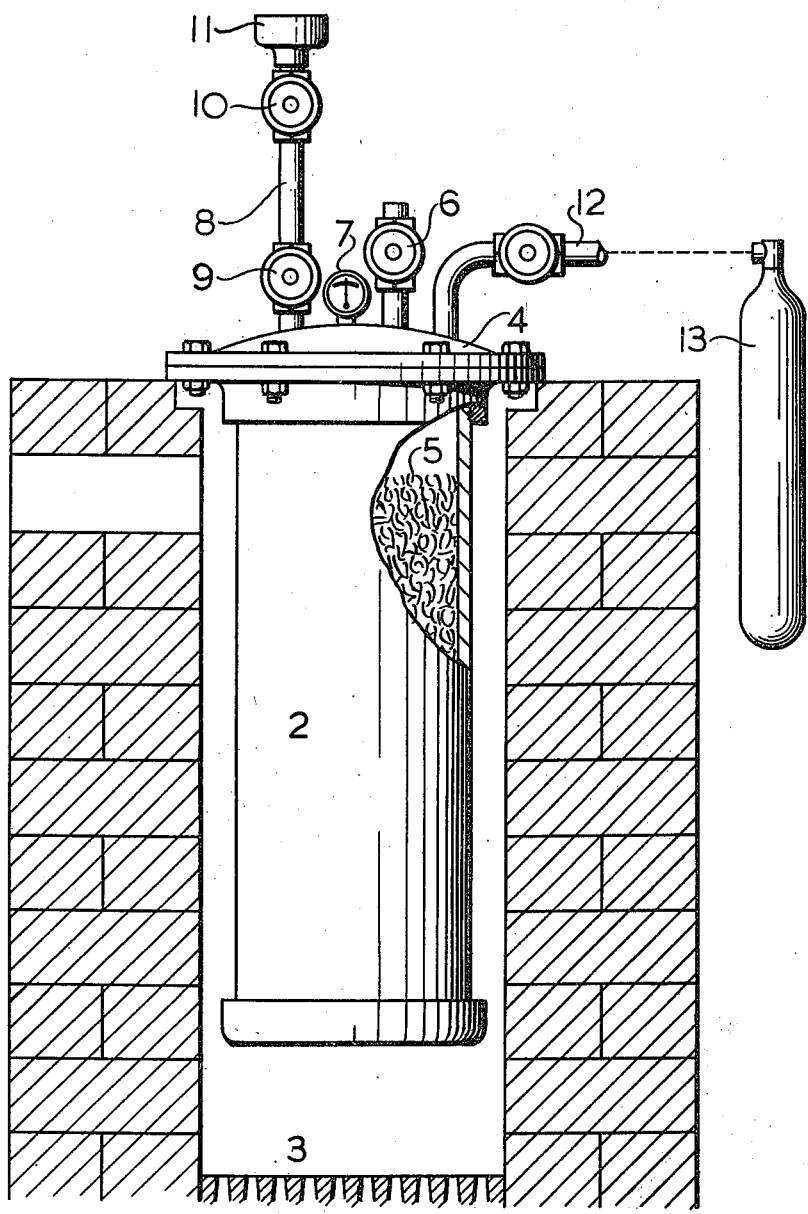

2,122,527

UNITED STATES PATENT OFFICE

2,122,527

RECOVERY OF PRECIOUS METALS FROM SOLUTIONS

Otto Lebrecht Kröhl, St. Albans, District Port Elizabeth, Cape Province, Union of South Africa, assignor to Tube Gold Extractors (Proprietary) Limited, Johannesburg, Union of South Africa, a company of the Union of South Africa Application October 22, 1936, Serial No. 107,108
In the Union of South Africa June 2, 1936

4 Claims. (Cl. 75—108)

This invention relates to precipitants for precipitating precious metals, especially gold, from their solutions and particularly from their cyanide solutions.

According to the invention, precious metal in solution is precipitated on carbon which has been activated as a precious metal precipitant by impregnation with a reducing agent.

The carbon is preferably provided in porous form for instance as charcoal. As the reducing agent it is preferred to use hydrogen gas or a metal such as zinc or mercury, but especially the latter. The charcoal is conveniently impregnated by heating it and thereby expelling its air and moisture content, then contacting it with the reducing agent in the form of gas or vapour, and allowing it to cool while contact is maintained.

The accompanying drawing shows, in sectional elevation, apparatus suitable for effecting the impregnation of the charcoal.

2 indicates a closed container provided with heating means 3 and adapted to work with an internal pressure of say 30 lbs. per square inch. It is fitted with a door 4 to permit a charge of charcoal 5 to be inserted and removed. 6 is a valved outlet for air and moisture. 7 is a gauge for indicating pressure within the container, higher or lower than atmospheric pressure. 8 is a vessel for holding mercury, fitted with the delivery valve 9 and the filling valve 10 surmounted by a cup 11.

The procedure, when impregnating the charcoal with mercury, is to heat the charcoal to say 300° C. for a period sufficient to drive off air and moisture through the open valve 6. Valve 6 is then closed and heating is discontinued. Valve 9 being closed, valve 10 is opened and a charge of mercury sufficient to impregnate the charcoal is poured into vessel 8. Valve 10 is then closed and valve 9 opened to discharge the mercury into the container where it is vapourized and impregnates the charcoal. The container is left to cool and is then opened to discharge the impregnated charcoal.

In the case of hydrogen treatment a valved inlet 12 is provided for the admission of the gas from, say, a cylinder 13 containing the gas in a compressed state. For impregnating the charcoal with zinc, that metal is vapourized at the necessary high temperature, either in the container 2, or in a separate retort, whence it is conducted to inlet 12.

When cold, the charcoal is withdrawn and is used as a gold precipitant in any convenient manner. For instance it may take the place of the filamentous zinc in the usual precipitation boxes, or be added to the pregnant gold solution as dust which is subsequently filtered out of the impoverished solution.

When the charcoal has served its purpose as a precipitant, the mercury or zinc, if present, is removed; the charcoal is burnt off; and the residue is smelted. The removal of the activating metal may be effected, in the case of mercury, by retorting it; and in the case of zinc, by dissolving it in acid.

The novel precipitants provided by the invention do not require the addition of lead acetate or lead nitrate which is necessary in order to obtain the best results from the usual filiform zinc precipitant. Moreover when mercury or hydrogen is employed as the carbon activating agent, the "sulphating" of the used precipitant, that is the removal of its residual zinc content by dissolution in sulphuric acid, which is a necessary procedure in the filiform zinc precipitation process, is done away with.

I claim:

1. The process of activating carbon whereby its activity as a precious metal precipitant is increased, which consists in exposing carbon when heated and while it is thereafter allowed to cool to mercury vapour.

2. A precious metal precipitant consisting of carbon impregnated with mercury.

3. The process of precipitating precious metal from solution which consists in contacting the precious metal bearing solution with carbon impregnated with mercury.

4. The process of activating porous carbon whereby its activity as a precious metal precipitant is increased comprising the steps of heating carbon so as to drive off air and moisture, producing an atmosphere of metal vapour around the heated carbon by vapourizing pure metal and cooling the carbon in said atmosphere of metal vapour so as to condense metal vapour on the surface and within the pores of the carbon.

OTTO LEBRECHT KRÖHL.